Feb. 6, 1962     H. SALVATORI ETAL     3,020,521
VARIABLE DELAY LINE
Filed May 15, 1957     3 Sheets-Sheet 1
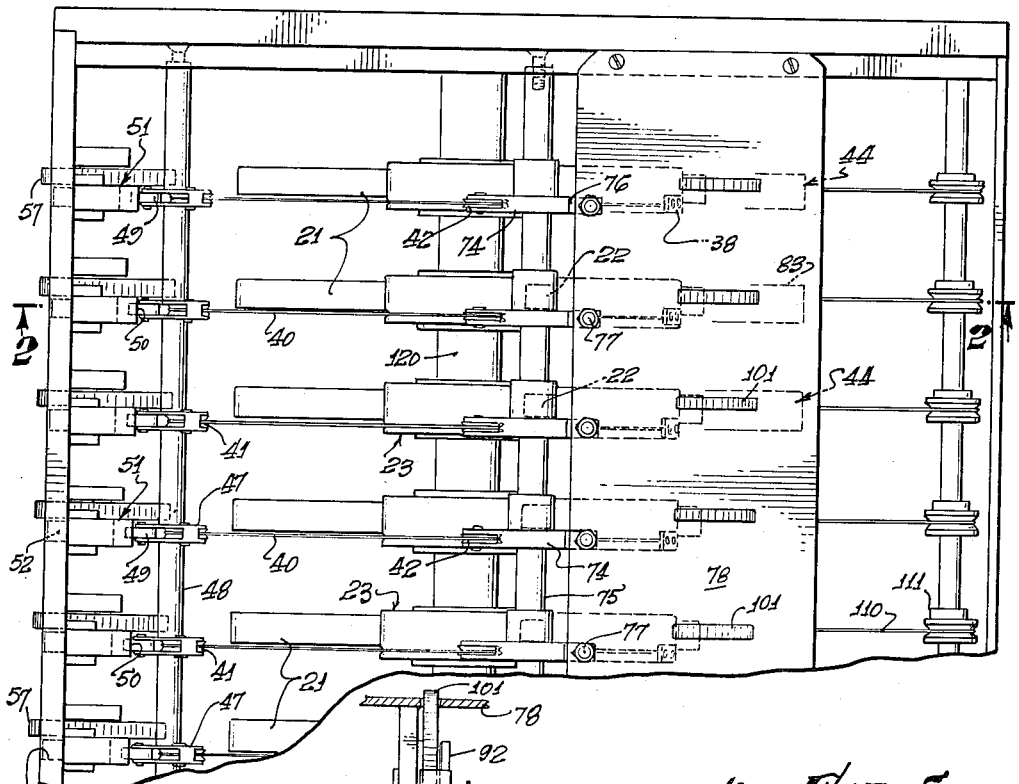
Fig. 1.
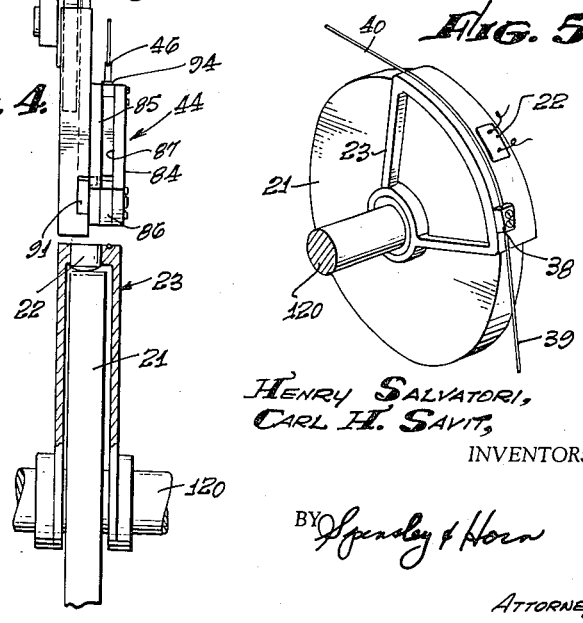
Fig. 4.
Fig. 5.
HENRY SALVATORI,
CARL H. SAVIT,
INVENTORS.
BY Spensley & Horn
ATTORNEYS.

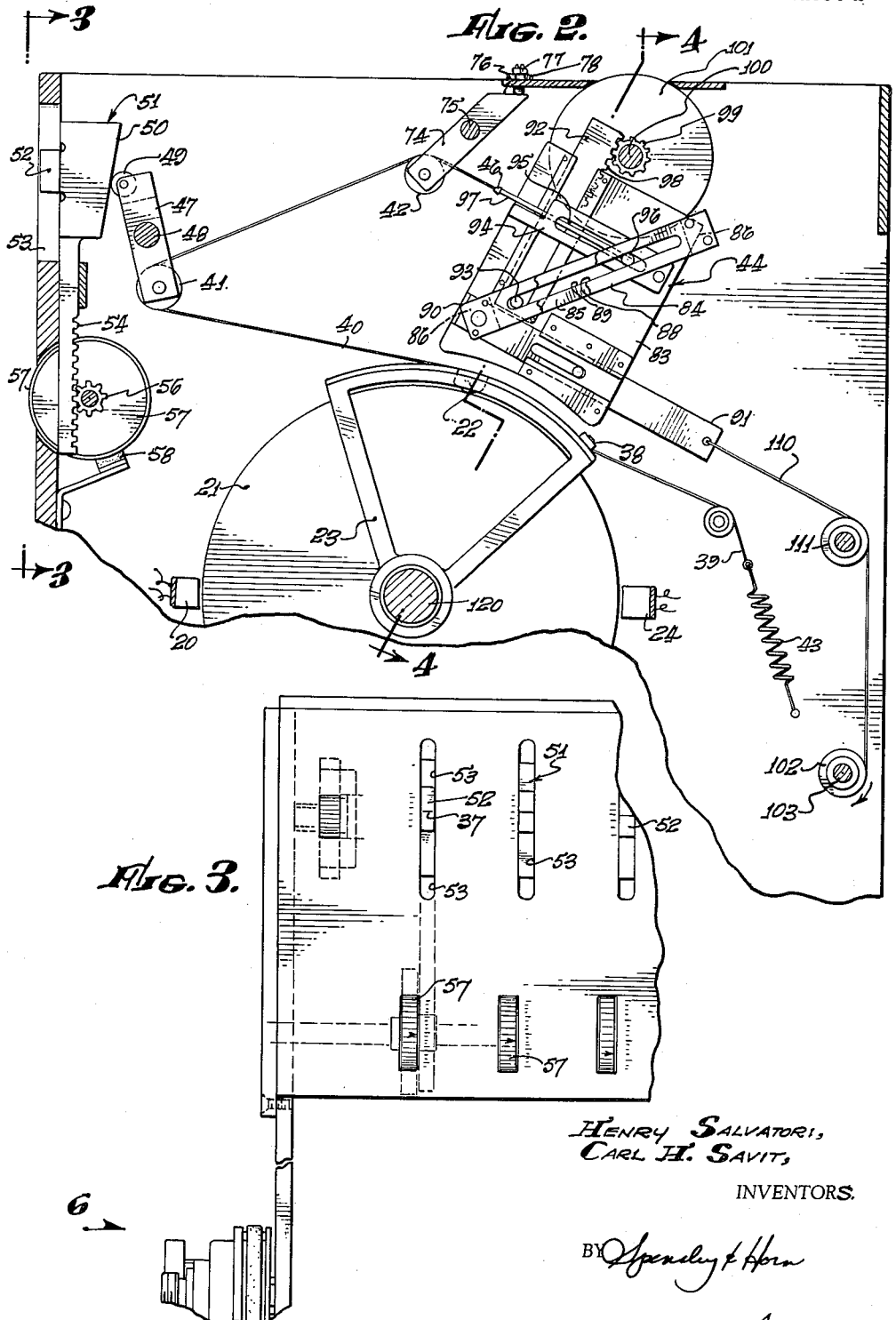

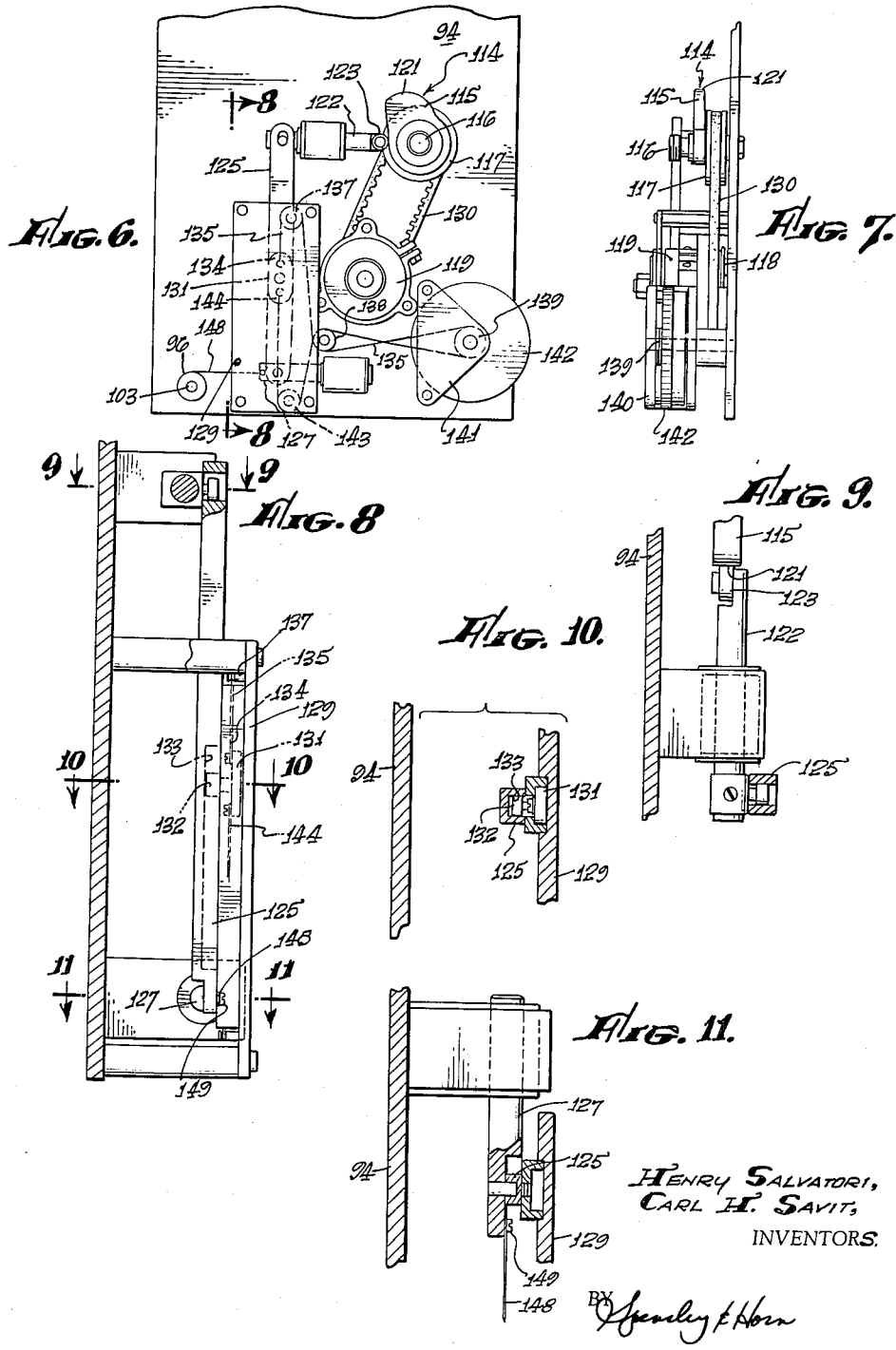

3,020,521
VARIABLE DELAY LINE
Henry Salvatori and Carl H. Savit, Los Angeles, Calif., assignors to Western Geophysical Company of America, Los Angeles, Calif., a corporation of Delaware
Filed May 15, 1957, Ser. No. 659,435
2 Claims. (Cl. 340—15)

This invention relates to magnetic delay lines and more particularly to a magnetic delay line wherein the delay period may be varied controllably and continuously during the operation of the delay line.

In many applications in which magnetic or other delay lines are used, it is desirable that the period of delay be subject to the control of the operator. By changing the delay period of a delay line, it is possible to alter the time origin or time scale of continuously varying signals.

Although such corrections and calibrations are advantageous in many applications in the computer and allied arts, they are particularly desirable in connection with data obtained in the process of seismograph exploration. Accordingly, the present invention will be described in connection with the art of reflection seismograph prospecting as an illustrative application and embodiment.

In making seismographic surveys by the so-called reflection method, a record is made of the earth's disturbance produced at a given point by a detonation initiated near the earth's surface at another point. In general, the record shows waves which have traversed paths close to the earth's surface and waves which have penetrated the earth and have been reflected by interfaces between two layers of different properties or characteristics. In many cases, several interfaces are present at varying depths and the record will show waves reflected from such interfaces. The amplitude of such reflected waves will vary over a considerable range depending upon the reflection coefficient associated with each interface.

For purposes of illustration, in a common arrangement of seismographic exploratory and recording apparatus used for seismographic profiling work, a plurality of seismometer or detector groups are disposed in contact with the ground in a preferably straight line at opposed sides of the shot point. A recording unit, provided with suitable amplifying and recording means is electrically connected to the detectors to amplify and record the electrical impulses produced by the detectors upon the arrival at each detector group of seismographic waves generated by an explosion at the shot point and reflected by the various underground formations.

The electrical impulses produced by the detector groups are recorded by various recording methods known to the art which are time-scale records of the shock waves received at the detector groups. The desirability of being able to apply time origin corrections and time scale calibrations into a seismographic recording apparatus is readily apparent, for example, in introducing "move-out" corrections or corrections due to surface profile of the area being explored. Move-out corrections are necessary since the detector groups are at varying horizontal distances from the shot point, and a greater time interval will be required for a reflected wave to reach the outermost detector group than the time interval which is required for the reflected wave to reach an inner detector group from an interface the same vertical distance below each. As the depth of the reflection increases, the time differential required to reach the various detector groups becomes smaller with the time differential approaching zero as the depth of reflection approaches infinity. In addition to the above move-out consideration, the various detector groups will in general be situated at various elevations so that it will be desirable to make time scale adjustments to reduce all readings to a common horizontal plane. Similarly, origin adjustments of the time scale are often necessary to compensate for varying amounts of near-surface weathered material under the different detector groups. In off-shore exploration such corrections may be required by varying depths of water.

In the course of seismographic exploration a multi-channel time scale record is obtained as described above by means of a multi-channel magnetic tape recording, multi-channel oscillographic camera recordings and other methods known to the art. In accordance with this invention a corrected time record may then be obtained from the uncorrected record obtained in the field, or, conversely, by means of the present invention a corrected time scale record may be obtained directly in the field from the signal producing detector groups. Such a corrected record facilitates analysis of the results of the seismographic exploration. In addition, the variable delay apparatus of the present invention is used to provide time origin correction and time scale calibration of a varying electrical signal from any transducer or signal source and to transmit the time scale corrected signal from the apparatus as the input signal for any suitable recording means.

Accordingly, it is an object of the present invention to provide means for introducing time origin corrections into an electrical input signal.

It is another object of the present invention to provide means for introducing time scale calibrations into an electrical input signal.

It is a further object of the present invention to provide means for applying arbitrary time origin corrections and linear or non-linear time scale calibrations independently and variably at each channel of a multi-channel recording system.

It is still another object of the present invention to provide apparatus for applying time origin corrections and time scale calibrations to time scale recorders of the type well known to the art.

A still further object of the present invention is to provide a magnetic delay line wherein the delay period may be varied continuously and controllably during the operation of the delay line.

Another object of the present invention is to provide a multi-channel variable delay line in which a time scale transformation in the form of $T_n = t + A_n + B_n F(t)$ can be made independently to the electrical input signal of each channel. The subscript member $n$ is here used to designate by number the channel to which a designated transformation is applied.

The present invention is a method and means for applying a time scale correction and calibration to an electrical input signal comprising a magnetic reading head positioned proximate a rotating circumferential surface, said surface being magnetically sensitized. A magnetic writing head is positioned proximate the rotating surface at a time scale position prior to the time scale position of the reading head with respect to the magnetically sensitive surface measured along the direction of motion of the drum. A magnetic erase head is positioned proximate the rotating surface at a time scale position subsequent to the time scale position of the reading head. By means of the present invention the time scale position of the reading head is varied to obtain time origin corrections and time scale calibration which consists of applying to the time scale $t$ a transformation of the form $$T_n = t + A_n + B_n F_n(t)$$

The reading head is mounted in accordance with this invention to be movable circumferentially with respect to the rotating surface. A flexible means of fixed length is affixed to the reading head which is normally urged opposite to the direction in which the flexible means extends over a static correction means and thence to a dynamic calibration means. The static correction means provides variation of the origin point of the reading head by a predetermined amount $A_n$ by varying the distance from the reading head to a fixed reference line parallel to said surface. Similarly, the dynamic calibration means provides movement of the head in accordance with a predetermined function $B_n F(t)$ during rotation of the drum.

Although the present invention is described with particular reference to an embodiment in which the recording means is fixed and the reading means is movable, it is equally valid to fix the reading head and provide moving means for the recording head. Indeed there are certain advantages to effecting the static correction by moving one of the two heads and effecting the dynamic calibration by moving the other head whereby both the recording and reading heads are thus movably related to the recording medium.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawing is for the purpose of illustration and description only, and is not intended as a definition of the limits of the invention.

FIGURE 1 is a plan view of a shaft mounted variable magnetic delay line in accordance with the present invention in which the time origin and time calibration adjusting means are shown in detail for a single channel in a multi-channel system;

FIGURE 2 is a view in elevation taken along line 2—2 of FIGURE 1 showing the head mounting means and time origin and calibration means of the present invention as applied to a magnetic recording disc of the type well known to the art;

FIGURE 3 is an enlarged partial view in elevation taken along line 3—3 of FIGURE 2;

FIGURE 4 is an enlarged partial view in elevation taken along line 4—4 of FIGURE 2;

FIGURE 5 is a partial perspective view of the recording disc and head mounting means;

FIGURE 6 is an end view in elevation of the apparatus of the present invention;

FIGURE 7 is a side view corresponding to FIGURE 8;

FIGURE 8 is a partial enlarged view taken along line 8—8 of FIGURE 6;

FIGURE 9 is a partial view taken along line 9—9 of FIGURE 6;

FIGURE 10 is a partial view in cross-section taken along line 10—10 of FIGURE 8; and FIGURE 11 is a view in cross-section taken along line 11—11 of FIGURE 8.

Referring to the drawings, FIGURES 1 and 2 indicate the presently preferred embodiment of the invention used in conjunction with a multi-channel variable magnetic delay line in which six channels are used for purposes of illustration. In the plan view of FIGURE 1 the entire apparatus of the present invention is completely shown in only one channel for purposes of clarity of description. Again using a seismographic exploration apparatus as an illustrative application of the present invention, an amplifying unit is electrically connected to the detector groups to amplify the electrical impulses produced by the detectors upon the arrival at each detector of seismographic waves generated by an explosion at the shot point and reflected by the various underground formations, as discussed hereinbefore.

It is to be expressly understood that although seismographic exploration is used as an application in which the present invention is particularly desirable, the invention is not limited thereto and may be used in any application of a recording and/or play back apparatus in which it is desirable to introduce arbitrary time origin corrections or time scale calibrations.

In the illustrative application the intensity of the electrical signal is transmitted by the detector group or other signal sources through an amplifier (not shown) to a magnetic recording head 20 in this embodiment where it is impressed upon the surface of a magnetically sensitized surface of a rotating disc 21. Thus, the intensity of the electrical impulse received at the magnetic recording head 20 is proportional to the intensity of a reflected shock wave received at an individual detector group in the illustrative seismographic recording apparatus. The changes in the seismographic wave reaching the signal detector group will cause a variation in the signal intensity at the magnetic head 20 which has the characteristics of the reflected seismographic wave or other variable amplitude signal emanating from a signal source.

The record produced upon the recording medium of the rotating disc 21 is thus a time scale record of the signal intensity with the time scale $t$ introduced by the movement of the recording surface at a constant speed past the recording head 20. The present invention achieves time origin corrections and time scale calibrations which consist of applying to the time scale $t$ a transformation of the form $T_n = t + A_n + B_n F(t)$ where the parameter $A_n$ and the quantity $B_n$ may vary from channel to channel as indicated by the index $n$.

The presently preferred embodiment of the present invention is described in connection with the application of the apparatus in which signals are transmitted to the apparatus from an uncorrected multi-channel tape recording to form a corrected tape recording. Thus, in this embodiment the magnetic heads 20 are recording heads to which a multi-channel variable electrical signal is transmitted from an uncorrected magnetic recording. These quantities are capable of being varied at will by means of the present invention. $A_n$ is, in particular, capable of being given the same value for all $n$, $B_n$ is likewise capable of being given the same value for all $n$, and $F(t)$ is, in particular, capable of being set equal to zero.

Referring now particularly to FIGURES 1, 2, 4 and 5, an improved means for mounting a magnetic reading head 22 in accordance with the present invention is shown. A plurality of magnetic reading heads 22, equal in number to the number of channels in the variable delay line apparatus are arranged in side by side relationship. Each head 22 is mounted, in accordance with this invention, for circumferential movement with respect to the rotating disc 21 by means of a head mounting member 23. As shown in FIGURES 2, 4 and 5, the member 23 is arcuate with an inside diameter substantially equal to, but greater than the outside diameter of the disc 21. Each head mounting member is rotatably affixed to the drive shaft of the disc 21 by means of member arms extending perpendicularly to the shaft from the member proximate the sides of the disc. The member arms define a bearing within which the shaft is rotatable but which support the member in circumferential relation with the surface of the disc. Accordingly, the shaft and disc affixed thereto are rotatable within the head mounting member while the head mounting member is in turn arcuately movable with respect to the magnetized surface of the disc. Although the reading head may be affixed to the head mounting member for contact with the surface by spring loading or other means known to the art, in the present variable delay line used as illustrative of the present embodiment, each magnetic reading head is in spaced relationship to the surface of the disc. A substantially constant spacing is obtained by mounting the head from the shaft in accordance with this invention. Thus, in the embodiment shown each rotating disc and head mounting assembly define one channel of a multi-channel variable delay line, although two or more channels may similarly be applied to each disc as described hereinafter. In the embodiment shown, the bearing of the support arms within which the shaft rotates are roller bearings although any low friction bearing of the type well known to the art may be used.

As discussed hereinbefore the magnetically sensitive discs and head mounting members are arranged in side by side relationship coincident with the plurality of channels to be recorded. Thus, each head mounting member is parallel to a plane passing perpendicularly through the rotating discs and each head is movable along a perpendicular circumference of the respective disc. The mounting member arms and head mounting member affixed thereto may be moved arcuately along the surface of the disc to vary the position at which the head reads a signal upon the rotating recording medium affixed to the disc surface.

A magnetic "writing" head of the type well known to the art is used to produce, or record, a signal upon the magnetically sensitive surface of the rotating disc at a time scale position prior to the time scale position of the reading head. That is, an electrical signal is transmitted to the stationary writing head which is positioned proximate the surface of the disc from a signal source such as, for example, a magnetic recorder or sound film track. Since the writing head is stationary while the disc is rotating the signals produced upon the disc constitute a time scale record of signals received at the writing head measured along the direction of motion of the disc surface. Therefore, if the disc is rotating clockwise as shown in FIGURE 2, the magnetic writing head is positioned proximate the surface of the disc counterclockwise from the reading head. Since the reading head is arcuately movable the writing head is positioned beyond the counterclockwise limit of movement of the reading head.

Similarly, an erase head 24 is positioned proximate the magnetically sensitive surface subsequent to the time scale position of the reading head. Thus, the erase head is positioned proximate the circumferential surface clockwise of the reading head and between the position of the reading head and writing head. In this embodiment the erase head is affixed to the apparatus chassis approximately diametrically opposed to the position of the writing head. Additional erase heads may be disposed along the circumference of the disc spaced from the illustrated erase head clockwise to a position proximate the writing head, but counterclockwise therefrom.

The writing head, reading head and erase head all lie substantially in the plane of a channel in the multi-channel apparatus as discussed hereinbefore. That is, the three heads lie in the plane of rotation of the respective disc.

It may be seen that when an electrical signal is transmitted to the writing head from an electrical signal source or transducer (not shown) the signal is recorded upon the surface of the rotating disc. As the portion of the disc upon which the signal is recorded rotates beneath the reading head, it is read and transmitted by the reading head to a recording apparatus (not shown). Subsequently, as the portion of the disc rotates beyond the reading head it is erased by the erase head. Thus, a continuously varying signal is transmitted to the writing head and from the reading head at a later time determined by the rate of rotation of the disc and the circumferential distance along the surface of the disc from the writing to reading head. If the reading head remains stationary, the signal will be transmitted as received at the writing head, but at a uniformly delayed time. Since the time scale of the magnetic record is measured along the direction of motion of the disc, an arcuate displacement of the reading head is tantamount to an alteration of the time scale.

In order independently to control the arcuate position of each reading head, the head 22 is affixed to the head mounting member 23 at a predetermined radial distance from the magnetically sensitive surface of the disc 21. A bracket 38 or similar attaching means is affixed to the head mounting member with flexible cables 39 and 40, or similar flexible holding means, extending oppositely therefrom substantially in the plane of arcuate movement of the head mounting member 31. The first cable 39 is affixed to a tensioning means such as a coil spring 43 which is in turn affixed to the apparatus chassis to urge the mounting member clockwise in FIGURE 2. The second cable 40 extends opposite to the first cable 39 over a static correction pulley 41 and a trimmer pulley 42 and is affixed to a dynamic correction linkage 44 as discussed in detail hereinafter. Since the length of the second cable 40 between the bracket 38 and the affixing point 46 on the calibration linkage 44 is fixed, it may be seen that the arcuate position of the head 22 will be determined by the position of the movable affixing point 46 and the relative positions of the movable static correction pulley 41 and trimmer pulley 42. Thus, by varrying the location of any of the three cable support points, i.e., the pulley 41, the pulley 42, or the linkage affixing point 46, the second cable 40 will pull the mounting member 23 and head 22 to the left in FIGURE 2 against the force of the spring 43. Although a head assembly and cables 39 and 40 are shown for a single channel in FIGURE 2, the assembly is similar for all channels in the multi-channel system.

Referring first to the static correction pulley 41, it may be seen that if the trimmer pulley 42 and movable affixing point 46 for a given channel are maintained in a constant position, the position of the mounting member 23 and head 22 affixed thereto is varied by varying the position of the static correction pulley 41. Referring particularly to FIGURE 2 the static correction pulley 41 is rotatably mounted at one end of a pulley lever arm 47 which is pivotally mounted upon a pivot bearing 48 to rotate substantially in the plane of the arcuate movement of the head 22, i.e., in a plane perpendicular to the axis of the disc 21. The pivot point 48 of the pulley lever arm 47 is approximately at the midpoint of the lever arm. At the opposed end of the lever arm 47 a cam follower 49 is rotatably mounted to bear against and maintain contact with a cam surface 50. The cam surface 50 is linear in this embodiment and is sloped upward and to the right in FIGURE 2. Since the mounting member 23 is urged to the right by the first cable 39, the second cable 40 is maintained in tension and urges the static pulley 41 to the right to rotate the pulley lever arm 47 in a counterclockwise direction in the figure. Accordingly, if the cam 51 is lowered the cam surface 50 forces the cam follower 49 to the right, rotates the lever arm 47 clockwise and moves the mounting member 23 to the left against the pressure of the spring 43. Contrariwise, if the cam is raised, the lever arm is allowed to move counterclockwise by the cam follower and the spring 43 moves the rocker member to the right in the figure. Thus, the arcuate position of the head 22 may be varied with respect to the surface of the disc 21 by raising and lowering the cam 51. Therefore, the magnetic reading head 22, which is used to read a signal upon the recording surface of the disc is displaced along the direction of motion of the recording surface. Since the time scale of the magnetic record is measured along the direction of motion of the disc, such a displacement is tantamount to an alteration of the time origin. Time origin corrections $A_n$ for each channel are therefore made by varying the position of the cam 51 associated with the respective channel. That is, a cam 51 such as that described above and shown in FIGURE 2 is associated with each channel in the multi-channel variable delay apparatus and each cam is independently movable to vary the reading point of each channel. Referring again to FIGURES 2 and 3 each cam 51 is vertically movable within a cam slot 53 by which the cam is maintained in vertical alignment in the plane of movement. The cams are vertically maintained by the slot 53 by providing a protrusion 52 on the cam 51 which extends into the slot 53. The width of the protrusion 52 is substantially equal to, but less than the width of a slot 53, and the centerline of the slot 53 and protrusion 52 lie in a vertical plane coincident with, or parallel to, the vertical plane passing through the centerline of the cam 51 and cam shaft 54. Since the slots 53 of the respective channels pass through the front wall of the chassis 29 the protrusions are visible to afford a position indicating means for the position of the reading heads. That is, an index mark 37 is made on the protrusions to indicate the position of the cam in each channel relative to graduation marks placed proximate the slot 53, and consequently the position of the head 22 in each channel. The cam 51 is slidably mounted in the slot 33 and vertically positioned by a vertically extending rack 54 which is mateable with a pinion 56. The pinion is in turn rotatably mounted upon, and perpendicular to, the forward wall of the chassis 29 and is affixed to an adjusting knob 57. The knob is larger in diameter than the pinion such that the circumference of the adjusting knob 57 extends through the front wall of the chassis. Accordingly, the vertical position of the cam 51 can be adjusted from the exterior of the chassis by rotation of the adjusting knob. In order to maintain the vertical position friction engaging means 58 are positioned in sliding contact with the knob 57.

Referring again to FIGURE 2, after passing over the static correction pulley 41 the second cable 40, hereinafter termed the head cable 40, passes over, and is engaged by, the trimmer pulley 42. Again it may be seen that since the length of the head cable 40 is constant, the position of the magnetic head 22 affixed thereto may be varied by varying the location of the trimmer pulley 42 when the static correction pulley 41 and affixing point 45 are held constant. It should be noted that the static correction pulley 41 and trimmer pulley 42 are located such that the cable 40 in passing from the bracket 38 (where it is affixed to the head mounting member 23) to the fixed point 46 passes over both pulleys and is maintained in tension at both pulleys. Thus, a movement of either pulley in either direction will allow movement of the reading head 22. The trimmer pulley 42 is rotatably mounted upon a pulley lever arm 74 which is pivotally mounted upon a pivot bearing 75 to rotate substantially in the plane of movement of the static correction pulley 41, i.e., in the vertical plane. The pivot point is approximately at the midpoint of the lever arm 74 and a substantially horizontal bearing surface 76 is provided at the upper end of the lever arm proximate the upper surface of the chassis 29. A trimmer adjustment screw 77 is mounted through the upper surface of the chassis by means of a bracket 78, with which it is threadably mateable. The bearing end of the trimmer screw 77 is in contact with the bearing surface 76 of the pulley lever arm 74. Thus, by turning the trimmer screw 77 to raise and lower the screw 77, arcuate movement of the pulley lever arm 74 about the pivot point 75 is produced which in turn varies the position of the magnetic reading head 22 in the respective delay channel. If, prior to a static correction adjustment or a dynamic calibration as discussed hereinafter, fine correction or initial correction of the position of the head 20 in a channel is required, such correction is made by adjusting the trimmer screw. For example, the trimmer pulley of each channel can be used to adjust all of the heads within strict limits to a straight line time scale origin position prior to any operation of the recording apparatus. It should be noted that in order to make a fine adjustment by vertically varying the position of the trimmer screw 77, the pulley lever arm 74 is normally aligned at an angle to the vertical to prevent a dead center situation.

Referring now to FIGURES 1, 2 and 12 the means for obtaining the dynamic time scale correction $B_n F(t)$ in the time scale transformation $$T_n = t + A_n + F_n(t) = t + A_n + B_n F(t)$$

is shown. Referring particularly to FIGURE 12, a dynamic correction linkage 44 is shown in detail. The linkage 44 is a variable pivot linkage wherein movement at the output end of the linkage arm is varied by transversely varying the pivot point. The linkage arm 45 provides an affixing point 46 to which the head cable 40 for the respective channel is affixed. A proportioning linkage similar to that shown in FIGURES 2 and 4 is provided for each channel, and accordingly a single linkage assembly in conjunction with a single channel is shown and described. The linkage arm 45 comprises a first side 84 and a second side 85 which are spaced apart at the ends thereof by spacers 86. The first side and second side are substantially similar and are affixed in parallel relation by the spacers 86 to define a transverse opening 87 therebetween. A longitudinal slot 88 is provided through the first side 84 extending substantially along the centerline of the linkage arm, while a second slot 89 is provided through the second side 85 substantially parallel to the first slot 88. The lower end 90 of the linkage arm 45 is pivotally affixed to a first connecting rod 91 which is in turn slidably mounted within a groove in a mounting plate 83. Similarly, a pivot bar 92 is slidably mounted within a groove which is provided in the mounting plate substantially perpendicular to the connecting rod 91. A pivot 93 having a diameter substantially equal to, but less than, the width of the slot 89 in the second slide of the linkage arm 44, is affixed to the pivot bar 92, and extends from the outer surface of the pivot bar into the slot 89 to be slidably engageable therewith. A transverse mounting member 94 is affixed to the mounting plate 83, but spaced therefrom to extend through the transverse opening 87 between the first and second sides of the linkage arm. The transverse mounting member 94 defines a longitudinal opening 95 within which a pivot point 96 is slidably mounted. The pivot 96 has a diameter substantially equal to, but less than, the width of the slot 88 in the first side 84 of the linkage arm 45 and is slidably engaged therewith. An actuating rod 97 extends through an opening in the transverse mounting member and is affixed to the pivot 96. Therefore, when the connecting rod 91 is moved, the actuating rod 97 is moved parallel to the connecting rod by an amount determined by the position of the pivot bar 92 and vertical pivot 93.

In the apparatus of the present invention the mounting plate 94 is affixed to the chassis 29 with the transverse member 94 and actuating rod 97 substantially coextensive with the head cable 40 which is affixed thereto. The pivot bar 92 extends through the upper wall of the chassis and a means is provided for adjusting the position of the pivot bar from the exterior of the chassis. In this embodiment a rack and pinion adjustment is used although other means well known to the art may also be used. A rack 98 is formed at the rearward edge of the pivot bar with a mateable pinion 99 rotatably affixed to the outer surface of the chassis by means of a shaft 100. An adjusting knob 101 is affixed to the pinion such that a portion of the circumference extends through the upper wall of the chassis. Accordingly, the position of the pivot bar 92 and pivot 93 can be adjusted by rotating the knob 101 from the exterior of the chassis. An index mark is provided on the chassis and calibration marks are provided on the circumference of the knob to indicate the position of the pivot 93. Thus, by rotating the knob 101 the pivot point of the linkage is varied to vary the amount of movement transmitted from the connecting rod 91 to the parallel actuating rod 97 to which the head cable 40 is affixed.

Means are provided for rotating the dynamic linkage 44 through a predetermined angular distance at a predetermined rate. In the presently preferred embodiment of the present invention an actuating cable 110 is affixed to the connecting rod 91 of the dynamic linkage 44 extending substantially parallel thereto over an idler pulley 111 to an actuating pulley 102. The cable 110 is affixed to the pulley 102 which is in turn affixed to a rotatable shaft 103 extending through the side wall 104 of the chassis 29. The pulley 102 lies substantially in the plane of the cable 110, while the shaft 103 is substantially perpendicular to the side wall 104 and the plane of the cable 110. The shaft 103 is rotatably mounted in a bearing surface defined by the side wall 104. A shaft driving pulley 106 is affixed to the outer end of the shaft 103. The shaft is longitudinally affixed and rotatably supported by means of brackets 107 and 108 positioned adjacent the opposite ends of the shaft to act as thrust bearing therefore. A shaft pulley similar to the pulley 102 is affixed to the shaft 103 for each channel in the apparatus and lies substantially in the plane of the cable 110 for the respective channel. Thus, rotation of the shaft driving pulley 105 causes rotation of the actuating pulley 102 in each channel to move the connecting rod 91 in the linkage 44 for each channel. When the pulleys 102 are of equal diameter, as in this embodiment, the distance through which the connecting rod is moved is substantially equal for all channels. Variations in the distance through which the cable 40, and consequently the head 22, is moved in each channel and thus the value $B_n$ in the transformation $$T_n = t + A_n + B_n F(t)$$

is accordingly governed by the position of the pivot point of the linkage for each channel as discussed hereinbefore.

Referring now to FIGURES 1 and 6 through 11, the means of the present invention for imparting the required rotation to the shaft pulley 103 in order to define the portion $F(t)$ of the function on $B_n F(t)$ at the magnetic reading heads is shown. The disc 21 is driven at constant speed by means well known to the art, such as a synchronous motor which is not shown. The rotating shaft 120 to which the discs 21 are affixed extends through the sidewall 94 of the apparatus chassis 29 and rotates within a bearing mounted in the side wall. Affixed to the side wall 94 is a magnetic clutch 119 or other engaging means of the type well known to the art which can be engaged to rotate with the disc shaft 120. The magnetic clutch is mounted symmetrically with respect to the shaft and can be energized by an electrical signal to become direct connected with the shaft and rotate therewith. The driven portion of the magnetic clutch, i.e., the portion of the clutch which rotates with the shaft when the clutch is engaged, is connected to a rotating cam means 114. The clutch may be connected with the cam means to drive the cam by methods known to the art. Thus, it may be direct connected, or connected through a belt, or driving chain. In the embodiment shown a belt drive is used. Referring to FIGURES 6 and 7 a cam shaft 116 is rotatably mounted by means of bearings upon the side wall 94 of the apparatus chassis at a position above the magnetic clutch 119. A driven pulley 117 is affixed to the cam shaft 116 substantially in the plane of the driving pulley 118 of the clutch 119. The cam 115 is removably affixed to the cam shaft 116 in order that different cams may be utilized for different applications of the apparatus in order to determine the necessary function $F(t)$. A driving belt 130 is connected between the cam shaft pulley 117 and the clutch pulley 118. In this embodiment a one-to-one ratio is used between the clutch pulley and cam shaft pulley such that the cam 115 rotates at the same angular rate as the clutch and consequently at the same angular rate as the disc 21. As discussed hereinbefore the cam surface 121 of the cam 115 is determined by the application in which the apparatus is utilized and the function of movement to be produced.

A connecting rod 122, as shown in FIGURES 6 and 9 is affixed to the side wall 94 and is substantially horizontally mounted for horizontal sliding movement. The connecting rod 122 is mounted proximate the horizontal centerline of the cam shaft 116 with a cam follower 123 rotatably affixed to the end of the connecting rod 122 in bearing contact with the cam surface 121. The connecting rod is horizontally urged toward the cam by means which will be more apparent hereinafter, to maintain the cam follower 123 in contact with the cam surface. Thus, the cam 115 when rotated imparts a horizontal movement to the connecting rod 122 which is dependent upon the cam configuration.

A linkage rod 125 is pivotally connected to the connecting rod 122 extending substantially vertically therefrom. The linkage rod lies in a substantially vertical plane and is pivoted about a movable pivot discussed hereinafter. The lower end of the linkage rod is pivotally connected to a second horizontal connecting rod 127 as shown in FIGURES 6, 8, 10 and 11. Positioned adjacent to, but spaced from the linkage rod 125 is a pivot bearing plate 129 which is affixed to the outer side of the linkage rod with respect to the side wall 94. The pivot bearing plate 129 lies in a substantially vertical plane and defines a vertical groove in the inner surface thereof having a centerline substantially in the plane of the linkage rod 125 when the linkage 125 is in the vertical position, i.e., the slot is proximate and parallel to the linkage when the linkage is vertical. A bearing 131 is positioned in the slot and is of sufficient height and width that it is horizontally retained by the groove but vertically movable therein. A pivot 132 is affixed to the pivot bearing 131 and extends inwardly where it is rotatably mateable with a pivot groove 133 in the adjacent face of the linkage rod 125 which extends along the centerline of the linkage rod. Thus, if the pivot bearing 131 is maintained in a constant position, the linkage rod is pivoted about the pivot 132 in that position. Means are provided for varying the pivot 132 to a predetermined position and maintaining the pivot at the predetermined position. In this embodiment a first end 134 of an adjusting cable 135 is affixed to the pivot bearing 131 and extends substantially vertically upward therefrom. The adjusting cable 135 passes over an idler pulley 137 which is rotatably mounted upon the pivot bearing plate 129 and lies in the plane of the vertically extending cable tangentially to the cable 135. The cable 135 then extends downwardly and crosses under a second idler pulley 138 which is again rotatably mounted in the vertical plane of the cable 135. From the second idler pulley 138, the adjusting cable 135 extends to, and crosses over an adjusting pulley 139. The adjusting pulley 139 is mounted substantially in the vertical plane of the cable by means of a mounting bracket 141 which is affixed to, and spaced outwardly from, the side wall 94 of the chassis. The adjusting pulley 139 is rotatably mounted by means of the bracket 141 and an adjusting knob of substantially greater diameter is affixed thereto. After passing over the adjusting pulley 139 the cable 135 is reversed in direction and extends inwardly where it again crosses over the second idler pulley 138. From the idler pulley 138 the adjusting cable extends downwardly and crosses under a third idler pulley 143. The third idler pulley is mounted below the pivot bearing 131 similarly to the first idler pulley 137 and vertically aligned therewith such that the innermost pulley tangent to the third idler pulley is vertically aligned with the pivot bearing 131. Accordingly, after passing under the third idler pulley 143 the adjusting cable 135 extends substantially vertically upward where the second end 144 of the cable is affixed to the pivot bearing 131. Thus, the adjusting cable 135 provides a closed loop adjustment with the ends of the cable affixed to, and extending oppositely from, the pivot bearing 131. When the adjusting knob 142 is rotated the adjusting pulley 139 causes the cable 135 to be shifted and consequently causes the pivot bearing and pivot 132 to be raised or lowered. Thus, by means of the adjusting knob 132 the amount of horizontal travel of the linkage rod 125 can be varied by shifting the pivot point of the linkage. That is, if the pivot 132 is moved to a position midway along the length of the linkage rod 125 the amount of horizontal movement of the lower connecting rod 127 is equal to the horizontal movement of the upper connecting rod 122 imparted by the cam 115. If the pivot point 132 is lowered, the proportional amount of movement of the lower connecting rod relative to the upper connecting rod becomes less, and conversely becomes greater when the pivot point 132 is moved above the midpoint.

It should be noted that since the linkage rod 125 is connected between horizontally moving connecting rods, the distance between the points at which the linkage rod is affixed to the connecting rods will increase when the linkage rod is inclined from the vertical. Accordingly, the linkage rod is pivotally affixed to the lower connecting rod while a slot 145 is provided in the linkage rod at the upper end which is rotatable about the pivot point 146 to allow an effective increase in the length of the linkage rod.

As shown in FIGURES 3, 6 and 11, a first actuating cable 148 is affixed to the first lower connecting rod by a screw 149. The actuating cable 148 extends substantially horizontally to the shaft driving pulley 96 to which it is affixed.

Thus, movement of the upper connecting rod 122 by rotation of the cam 115 is transmitted through the linkage rod 125 to the shaft 103 to cause the dynamic correction linkage 44 to be moved in response to the cam signal and in turn to move the magnetic reading heads 22 in accordance with a predetermined function $B_nF(t)$. Thus, calibration of the time scale is achieved by movement of the dynamic correction linkage 44 for each channel. The position of the pivot 93 about which the dynamic correction linkage rotates determines the relative movement between the reading heads in the respective channels. The dynamic correction may be made linear or non-linear by suitably varying the configuration of the cam 115 which in turn varies the rate of movement of the dynamic correction linkage. Further variation of the dynamic correction movement of the reading heads is obtained through the variable pivot about which the linkage rod 125 pivots in transmitting movement from the cam to the dynamic correction linkage. As discussed hereinbefore the series of reading heads may be independently varied by varying the pivot point of the linkage 125 to alter the magnitude of movement transmitted by the cam 115 through the linkage.

Thus, in operation the present invention is used to introduce a time scale correction to each channel of a multichannel variable magnetic delay apparatus by applying to the time scale $t$ a transformation of the form $$T = t + A_n + B_n F(t)$$

where the parameter $A_n$ and the function $B_nF(t)$ vary from channel to channel as indicated by the index $n$. In the illustrative embodiment, electrical impulses obtained from a plurality of detector groups (not shown) have been magnetically recorded on a magnetic tape. In order to apply the time scale transformation to obtain a corrected magnetic tape, signals emanating from the previously recorded tape are transmitted to the magnetic writing heads of the apparatus shown. The corrections to be applied are determined prior to corrected recording of the signals and the proper pivot settings for the dynamic calibration linkages 44 and the proper cam 115 are chosen to introduce the required function $B_nF(t)$ to each channel.

It should again be noted, as discussed hereinbefore, that although a corrected magnetic tape is recorded from a previously recorded uncorrected tape in this illustrative operation, the apparatus can be used to transmit a corrected output signal to a second recording device of any type known to the art for recording varying electrical impulses.

Prior to operation of the apparatus, all of the magnetic heads are accurately aligned to a common origin by use of the trimmer pulleys 42. To correct for manufacturing tolerances and errors in the length of cables 40 and in other assembled parts of the apparatus, the origin is thus corrected by setting the index mark on each cam protrusion at a zero reading in the vertical cam slots 53. This setting is achieved by varying the position of the cams 51 vertically until the index mark of all cams are at a zero reading. The heads are then horizontally aligned with respect to the surface of the discs 21 by turning the adjusting screw 77 corresponding to each trimmer pulley to vary the position of each trimmer pulley until the reading heads for all channels are aligned. At this point all channels are aligned at a common time scale origin with no corrections applied.

After the magnetic reading heads have been aligned to a common origin by means of the trimmer pulley 42 for each channel, the parameter $A_n$ is introduced into each channel. $A_n$ is predetermined for each channel by methods known to those skilled in the art to correct each channel from the origin in accordance with the application to which the apparatus is applied. That is, for a particular physical layout of detector groups on a known terrain the static correction for a given channel to compensate for surface profile or near-surface weathered material under the different detector groups may be determined. For applications of recording apparatus other than geophysical exploration the initial time scale correction may be made for various considerations. The correction $A_n$ is, therefore, made for each channel by rotating the adjusting knob 57 by which the cam 51 is raised or lowered to rotate the static correction pulley 41 which in turn causes the head 22 in that channel to be moved to the required position.

In order more clearly to describe the operation of the dynamic corrections introduced by means of the present invention during rotation of the disc 21, an operation will be described in which $A_n$ for each channel is equal to zero and $B_nF(t)$ is a function determined by moveout corrections in a geophysical exploration arrangement of seismometer detector groups in which three detector groups are positioned at opposite sides of a shot point. In the illustrative example, detector groups correspond to similarly numbered channels in the variable delay apparatus with detectors three and four positioned nearest the shot point at opposite sides thereof and detectors one and six farthest removed at opposite sides of the shot point. The detector groups each of which transmits a signal to be recorded in a channel are, therefore, divided into two series of three channels each representing shock wave reflections to each side of the shot point. Prior to operation of the time scale correction apparatus the distribution of the affixing points 46 on the dynamic correction linkage arms 45 are determined to compensate for the relative horizontal distance of each detector from the shot point. The proper cam 115 for a given application is then affixed to the cam shaft 116 to impart the varying rate of movement to the dynamic correction linkage 44 for a given application as will become more apparent hereinafter.

The pivot point 132 for the linkage rod 125 is then vertically adjusted to obtain the required amount of movement imparted by the cam 115. Thus, the adjusting knob 142 for the linkage rod 125 is rotated until the point is correctly positioned. Accordingly, movement of the cam follower 123 through a predetermined distance to the left in FIGURE 6 will cause the lower end of the linkage rod 125 to be horizontally moved a predetermined distance to the right in the figure. Movement of the lower end of the rod transmits an equal amount of horizontal travel to the actuating cable 148. In the illustrative embodiment shown, the actuating cable is affixed to the driving pulley 106 of the shaft 103 such that the cable is tangential to the upper side of the pulley. Movement of the cable therefore causes the shaft to be rotated clockwise in FIGURES 1 and 2. As shown in FIGURE 2 the connecting cables 110 to the linkages 44 are affixed to the driven pulleys 102 of the shaft 103 tangentially to the rearward side of the pulleys. Clockwise rotation of the shaft accordingly causes the connecting cables 110 to be wound on the pulleys which in turn causes the linkage arms 44 to be pivoted rearward at the lower end thereof. When the driving pulley 106 and driven pulley 102 on the shaft have equal diameters as in the illustrative embodiment, the distance through which the connecting cable 110 is moved is equal to the distance through which the actuating cable 148 is moved.

As the connecting cables 110 for each dynamic correction linkage arm 45 are pulled to the right in FIGURE 1, the cables 40 corresponding to the outermost channels one and six are moved through the greatest distance forward, or to the left in FIGURES 1 and 2, due to the lower channels.

Thus, in the seismographic illustration with an uncorrected previously recorded magnetic tape as the signal source to record a corrected take on a magnetic recording apparatus (not shown), a cam 115 is selected for the proper moveout correction with a portion of the cam surface at a substantially constant minimum diameter at which the linkage rod 125 is in the vertical position. With the heads 22 trimmed to a common time scale origin, and with the static correction $A_n$ equal to zero in all channels, the plurality of magnetic heads 22 are all aligned along a common line on the circumference of the discs 21. The discs 21 are then set in rotation at a steady rate. This rate may, however, be varied to extend the effective range of values of the calibration function. Thus, for example, halving the speed of rotation is tantamount to doubling the time interval between the write and read heads. In general, the velocity of rotation is inversely proportional to the time interval. The cam 115 is so synchronized that at time $t=0$ corresponding to the previously recorded time of the shot initiation, the lobe of the cam has passed to the position at which the cam follower is moved the maximum distance to the left. This causes the maximum moveout correction; that is, at time $t=0$ the heads 22 have been moved out of alignment by moving the dynamic correction linkages rearward as discussed hereinbefore. The reading heads therefore assume a shallow V-shape or U-shape dependent upon the distribution of the pivot points of the linkages 44 with channels one and six moved farthest from the origin line. With the disc rotating clockwise in FIGURE 2 it may be seen that all channels have been advanced along the time scale with the maximum advance being accomplished by channels one and six. Since the outermost channels (1 and 6) correspond to the outermost detector groups in the seismometer spread, the time delay due to the horizontal distance will be the greatest at these detectors and channels. As $t$ increases and the disc 21 and cam 115 continue to rotate the moveout correction required becomes less as discussed hereinbefore. Accordingly, the radius of the cam surface is decreasing in accordance with the function $F(t)$ until at a predetermined time no further correction is required. At this time the cam has moved to the position at which the cam follower is on the constant minimum radius and all heads have been moved into alignment.

During rotation of the discs a variable signal from the previously recorded input source is transmitted to each magnetic writing head 20. The signal from the writing head 20 for each channel is recorded upon the magnetically sensitive surface of the respective disc 21. As the signal passes beneath the reading head 22 for each channel it is read by the head 22 which transmits it as substantially the identical signal recorded by the writing head 20, but with a proper time scale delay due to the distance between the writing and reading head. Since this distance is varied in accordance with the transformation $$T_n = t + A_n + B_n F(t)$$

the time scale delay corresponds to that transformation at any given time. After passing beneath the reading head 22 the signal is erased by the erase head 24 such that the magnetically sensitive surface of the disc 21 is continuously clean for recording by the writing head and transmission to the reading head.

From the foregoing it will be seen that the static correction $A_n$ which is introduced into each channel as previously described will be superimposed upon the movement of the reading head due to the dynamic correction and that for each channel the total time scale variation is additive such that $T_n = t + A_n + B_n(t) = t + A_n + B_n F(t)$.

In view of the foregoing it will be seen that various modifications and rearrangement of components may be made without departing from the scope of the invention. For example, the reading head may be maintained fixed while the writing head is varied in accordance with the function by mounting the writing head on the movable mounting member and positioning the erase head after the reading head along the direction of motion.

What is claimed is:

1. A variable magnetic delay line for transmitting a time scale representation of an input signal wherein a time scale transformation of the form of $T = t + A + BF(t)$, where T is the transformed time scale, $t$ is the input time scale, A is a predetermined additive constant, B is a predetermined constant of proportionality, and $F(t)$ is a predetermined function of the said $t$, is applied to the time scale at the signal output, said delay line comprising: a rotating disc, a circumferential magnetic recording surface on said disc, said disc being affixed to a rotating shaft; a stationary magnetic recording head positioned proximate a first circumferential position on said surface for recording said input signal at a first time scale position; a magnetic reading head positioned proximate said surface along the direction of rotation of said disc from said recording head at a second time scale position on said surface, means for mounting said reading head for circumferential movement with respect to said disc, said reading head being affixed to said mounting means; means urging said mounting means in a first circumferential direction; a flexible line affixed at the first end thereof to said mounting means extending tangentially therefrom in a second circumferential direction opposed to said first direction, said line extending in a plane substantially perpendicular to the axis of rotation of said shaft; a static delay means for displacing said mounting means through a fixed predetermined distance to introduce a fixed static time delay equal to A, said static delay means including a pulley, said pulley being positioned substantially in the plane of said cable, said pulley being mounted upon a lever arm, said lever arm being pivotally mounted for arcuate movement in said plane, said cable being extended over said pulley and maintained in tension thereby, and means for varying the arcuate position of said pulley in said plane; a dynamic correction means for circumferentially moving said mounting means to continuously vary said second time scale position at a predetermined rate during rotation of said disc to introduce a dynamic correction equal to $BF(t)$ in said delay line, said line being affixed at the second end thereof to said dynamic correction means; and a stationary erase head positioned proximate said surface at a circumferential distance along the direction of rotation from said reading head.

2. A variable magnetic delay line for transmitting a time scale representation of an input signal wherein a time scale transformation of the form of $T = t + A + BF(t)$, where T is the transformed time scale, $t$ is the input time scale, A is a predetermined additive constant, B is a predetermined constant of proportionality, and $F(t)$ is a predetermined function of the said $t$, is applied to the time scale at the signal output, said delay line comprising: a rotating disc, a circumferential magnetic recording surface on said disc, said disc being affixed to a rotating shaft; a stationary magnetic recording head positioned proximate a first circumferential position on said surface for recording said input signal at a first time scale position; a magnetic reading head positioned proximate said surface along the direction of rotation of said disc from said recording head at a second time scale position on said surface, means for mounting said reading head for circumferential movement with respect to said disc, said reading head being affixed to said mounting means; means urging said mounting means in a first circumferential direction; a flexible line affixed at the first end thereof to said mounting means extending tangentially therefrom in a second circumferential direction opposed to said first direction, said line extending in a plane substantially perpendicular to the axis of rotation of said shaft; a static delay means for displacing said mounting means through a fixed predetermined distance to introduce a fixed static time delay equal to A, said static delay means including a pulley positioned, substantially in said plane of said cable, said pulley being mounted upon a lever arm at the first end thereof, said lever arm being pivotally mounted for arcuate movement in said plane, said cable being extended over said pulley and maintained in tension thereby, a static delay cam positioned proximate said lever arm, the second end of said lever arm being in contact with cam surface, and means for varying the position of said cam to vary the arcuate position of said pulley; a dynamic correction means for circumferentially moving said mounting means to continuously vary said second time scale position at a predetermined rate during rotation of said disc to introduce a dynamic correction equal to $BF(t)$ in said delay line, said line being affixed at the second end thereof to said dynamic correction means; and a stationary erase head positioned proximate said surface at a circumferential distance along the direction of rotation from said reading head.

References Cited in the file of this patent

UNITED STATES PATENTS

| | | |
|---|---|---|
| 2,440,971 | Palmer | May 4, 1948 |
| 2,750,449 | Thompson | June 12, 1956 |
| 2,765,455 | Meiners | Oct. 2, 1956 |
| 2,772,328 | Lyon | Nov. 27, 1956 |
| 2,800,639 | Lee | July 23, 1957 |
| 2,825,885 | Reynolds | Mar. 4, 1958 |
| 2,876,428 | Skelton | Mar. 3, 1959 |
| 2,940,536 | Bazzoni | June 14, 1960 |